Patented Nov. 26, 1946

2,411,664

UNITED STATES PATENT OFFICE 2,411,664

AMINO ALCOHOLS AND METHOD OF PREPARING THE SAME

Karl Miescher, Riehen, and Adrian Marxer, Basel, Switzerland, assignors to Ciba Pharmaceutical Products, Incorporated, Summit, N. J., a corporation of New Jersey No Drawing. Application July 6, 1942, Serial No. 449,960. In Switzerland July 25, 1941

8 Claims. (Cl. 260—570.6)

In the great field of application which has been found for the reactions with organo-metal compounds, it is surprising that the preparation of organo-metal compounds of halogenalkylamines and their reaction with reactive organic compounds have not yet been described. As experiments have shown, 2-chloroethyl-diethylamine, for example, does not react with magnesium under the usual conditions.

The subject of the present invention now forms a process for the preparation of amines, comprising reacting halogenamines, in which the halogen group is connected with the amino group by at least 3 carbon atoms, with metals and, if desired, allowing the resultant organo-metal compounds to react upon those reactive organic compounds which usually react with organo-metal compounds.

As parent materials use may be made of any desired halogenamines of the aliphatic, araliphatic, cycloaliphatic or heterocyclic series, in which an alkyl chain may be branched or interrupted, for example, by oxygen, sulphur or nitrogen atoms. As examples, mention may be made of chloropropyl-diethylamine, bromopropyl-diethylamine, bromopropyl-dibutylamine, iodopropyl-piperidine, chlorobutyl-dimethylamine, chlorobutyl-dipentylamine, chlorobutyl-methyl-cyclohexylamine, chlorobutyl - ethyl - cyclohexylamine, halogen-octyl-dialkylamines, and also compounds having still longer or more branching chains, as well as, for example, m- or p-halogen-cyclohexyl-dialkylamines, dialkylamino-alkyl-cyclohexyl-halides, N-methyl-γ-halogen-piperidines, or even chloroethyl-diethylaminoethyl ethers and other halogen-alkyl ethers or sulphides, and, further, halogen-alkylamino-alkylamines. Especially suitable are those halogenamines in which the halogen and the amino group are placed relatively distantly from one another. Specially to be recommended are those halogenamines which are disubstituted at the nitrogen atom and in which the substituents are of high molecular weight, such as chloropropyldibutylamine and -diamylamine, etc. For the reaction with these halogenamines, metals such as magnesium, zinc, potassium, lithium, sodium, and the like have proved suitable. In preparing the organo-metal compounds, it is advisable to activate the metal (magnesium, for example, with the help of small quantities of iodine and/or an alkyl-halide) and then quickly allow it to react with the corresponding halogenamine, work being carried out in presence of a solvent, for example, an ether (diethyl ether, dipropyl ether, amyl ether, anisole, etc.).

As reactive compounds which may generally be caused to react with organo-metal compounds, mention may be made of aromatic, fatty aromatic, hydroaromatic, aliphatic, and heterocyclic aldehydes, ketones, esters and nitriles, such as benzaldehyde, cuminaldehyde, veratric aldehyde, anisaldehyde, piperonal, naphthaldehyde, benzonitrile, benzoic acid ester, formaldehyde, acetaldehyde, trichloro- and tribromacetaldehyde, isobutyl aldehyde, oenanthole, citraldehyde, pyridyl aldehyde, furfurole, benzophenone, acetophenone, desoxybenzoin, diphenyl ketene, acetone, methylethyl ketone, diethyl ketone, cyclohexanone, camphor etc.

The present reaction is preferably carried out by adding the reactive compound in portions to the organo-metal compound according to the state of the reaction. The reaction is preferably carried out at about 40–50° C. in such a manner that the exothermic reaction is continually in progress. In this manner, the magnesium compound of the aminoalcohol formed remains in solution practically up to the end of the reaction, whereas, by too rapid addition of the reactive compound, it falls out of solution, bringing the reaction to a standstill and naturally reducing the yield to a considerable extent.

The end products either have therapeutic properties or can serve as intermediate products for the manufacture of therapeutically active substances.

The following examples illustrate the invention:

Example 1

4.8 grams of magnesium turnings (0.2 mol) are activated with a little iodine and are covered with 20 ccs. of absolute ether. The Grignard reaction is started by addition of 0.7 cc. of ethyl bromide, and 30 grams (0.2 mol) of 1-chloropropyl-(3)-diethylamine in 50 ccs. of absolute ether are allowed to run in over a period of 3–5 minutes. 0.5 cc. of ethyl bromide is then added, and the flask is gently warmed for 5 minutes. Only a very small portion of the magnesium is dissolved, and a white precipitate of diethylaminopropyl-magnesium chloride is formed.

The flask is now heated on a water bath to 45–50° C., and a total quantity of 18 grams (0.1 mol) of benzophenone in 80 ccs. of absolute ether is allowed to run in in portions. With each addition a lively action commences, the solution is temporarily coloured red and the magnesium is gradually used up. The reaction mixture is maintained for a further 12 hours at 45° C. and is worked up by decomposing the Grignard complex with ice and ammonium chloride. On shaking the ethereal solution with dilute hydrochloric acid, the hydrochloride of diphenyl-3-diethylaminopropyl carbinol is obtained, which melts at 179–179.5° C. after recrystallization.

Phenyl-benzyl-3-diethylaminopropyl carbinol can be obtained from desoxybenzoin in a similar manner.

Example 2

With 4.8 grams of magnesium in 20 ccs. of absolute ether and 30 gms. of chloropropyl-diethylamine in 50 ccs. of absolute ether, the magnesium compound is obtained in the manner described in Example 1, and to this is added continuously, in portions, 16 grams benzaldehyde in 50 ccs. of absolute ether. After boiling on the water bath at 50° C. for 12 hours, ice and hydrochloric acid are added. The aminoalcohol is extracted from the ethereal solution by means of hydrochloric acid; the free base is liberated from the united hydrochloric acid extracts and is then isolated by extraction with ether in the usual way.

The phenyl-3-diethylaminopropyl-carbinol, obtained in a yield of 67%, boils at 108–111° C. (0.03 mm.). The hydrochloride is crystalline but is very hygroscopic.

In place of magnesium, zinc, for example, may be used.

Phenyl-p-dimethylaminocyclohexyl carbinol is obtained if p-dimethylaminocyclohexyl chloride be used in place of chloropropyldiethylamine.

Example 3

The magnesium compound of the desired furyl-3-diethylaminopropylcarbinol is obtained in the manner described above from 4.8 grams magnesium (0.2 mol), 30 grams chloropropyldiethylamine (0.2 mol) and 14.4 grams furfurole (0.15 mol). On extraction with dilute hydrochloric acid the solution is quickly coloured dark blue, the base is liberated immediately, when it is treated in ether with dehydrated active charcoal and then distilled several times. B. Pt. 88° C. (0.07 mm.).

In an analogous manner, starting with pyridyl-(3)-aldehyde, for example, pyridyl-(3')-3-diethylaminopropyl carbinol is obtained.

Example 4

Working according to the method described in Example 1, 0.2 mol of chloropropyldiethylamine is caused to react with 0.1 mol (15.6 grams) of 1-naphthaldehyde.

The base isolated from the hydrochloric acid extracts, naphthyl-(1')-3-diethylaminopropyl carbinol, boils in a high vacuum (0.07 mm.) at 158–164° C. On standing, the highly viscous oil solidifies, forming leaflets which, when recrystallized from petroleum ether, melt at 59–62° C.

In an analogous manner, 1-chloro-2-dimethylaminomethylcyclohexane, for example, or its derivatives further substituted in the nucleus, can be caused to react with a cycloaliphatic substituted aldehyde.

Example 5

As is described in detail in Example 1, the diethylaminopropyl magnesium compound is prepared and is caused to react with 12 grams of acetophenone. The sparingly soluble magnesium compound of the alcohol is precipitated immediately. The methyl-phenyl-3-diethylaminopropyl carbinol, which is isolated in the usual manner, has a boiling point of 110° C. (0.07 mm.).

From the base, a hydrochloride of M. Pt. 133–134° C. which crystallizes in needles can be obtained.

Example 6

In a similar manner to that described above, 20.4 grams of anisaldehyde (0.15 mol) are brought to reaction.

The p-methoxyphenyl-3-diethylaminopropyl carbinol thus obtained boils at 142° C. (0.15 mm.) after being twice distilled. The yield is quantitative.

Example 7

From piperonal a practically theoretical yield of 3':4'-methylenedioxyphenyl-3-diethylaminopropyl carbinol is obtained. B. Pt. 136–142° C. (0.07 mm.).

The base yields a crystalline hydrochloride which, however, is very hygroscopic.

Example 8

From 4.8 grams of magnesium (0.2 mol), 30 grams of diethylaminopropyl chloride (0.2 mol) and 25 grams of veratric aldehyde (0.15 mol), 3':4'-dimethoxyphenyl-3-diethylaminopropyl carbinol is obtained in an analogous manner.

The base, a viscous oil, boils at 155–161° C. (0.07 mm.). From it, a hydrochloride (M. Pt. 128–132° C.) which crystallizes magnificently can be obtained; this may be purified by recrystallization from chloroform-ethyl acetate.

Example 9

2.6 grams magnesium, activated by means of iodine, is introduced into 20 ccs. of absolute ether and is caused to react with 0.6 cc. of ethyl bromide. Whilst warming gently, 16.2 grams (0.1 mol) of N-[1-chloropropyl-(3)]-piperidine in 40 ccs. of absolute ether are added and, after adding a further 0.5 cc. of ethyl bromide, 14.5 grams (0.08 mol) of benzophenone in 50 ccs. of anhydrous ether are added in portions. The magesium is used up fairly quickly and, after 10 hours, only traces are left. In working up, both with hydrochloric acid and with ammonium chloride, the hydrochloride of diphenyl-3-piperidinopropyl carbinol is precipitated as a dense precipitate. It is purified by recrystallization from chloroform-ethyl acetate. M. Pt. 212–214° C.

Example 10

In the manner described in Example 9, 4.8 grams (0.2 mol) of magnesium in 20 ccs. of absolute ether, 32 grams (0.2 mol) of chloropropyl-piperidine in 50 ccs. of absolute ether and 16 grams of benzaldehyde (0.15 mol) in 50 ccs. of absolute ether are caused to react. In a reaction which proceeds smoothly, 22 grams of phenyl-3-piperidinopropyl carbinol of B. Pt. 131–133° C. (0.06 mm.) are obtained. The base gives a beautifully crystallizing hydrochloride of M. Pt. 109–111° C., which can be purified by recrystallization from chloroform-ethyl acetate.

Example 11

In the same manner as in Example 10, 20.4 grams of anisaldehyde (0.15 mol) are converted into p-methoxyphenyl-3-piperidinopropyl carbinol. B. Pt. 153–158° C. (0.08 mm.); yield 74%. After distilling twice, the viscous oil solidifies to white crystals of M. Pt. 53–56° C. The hydrochloride is crystalline but deliquescent.

Example 12

In the same manner, 0.15 mol of piperonal can be caused to react with chloropropyl-piperidine. The 3′:4′-methylenedioxyphenyl - 3 - piperidino-propyl carbinol which is isolated boils at 168–170° C. (0.08 mm.). On standing, the base solidifies and may be recrystallized from benzene-petroleum ether. M. Pt. 71–71,5° C. The hydrochloride melts at 132–134° C.

Example 13

By the method described in previous examples, phenyl-3-dimethyl-aminopropyl carbinol is prepared from 5 grams of magnesium in 20 ccs. of absolute ether, 24.3 grams (0.2 mol) of 1-chloropropyl-(3)-dimethylamine in 50 ccs. of absolute ether and 15 grams (0.15 mol) of benzaldehyde in 50 ccs. of absolute ether. The base is a mobile oil, B. Pt. 106.5° C. (0.05 mm.) which, however, readily crystallizes to yield crystals of M. Pt. 45–48° C. Yield 70%.

Example 14

In the same way as in Example 13, 3′:4′-methylene-dioxyphenyl-3-dimethylaminopropyl carbinol, B. P. 162.5–164° C. (0.6 mm.), is obtained from 0.2 mol of chloropropyldimethylamine and 0.15 mol of piperonal.

Example 15

3.8 grams of magnesium in 20 ccs. of absolute ether, 30 grams (0.15 mol) of 1-chloropropyl-3-di-n-butylamine and 10.6 grams (0.1 mol) of benzaldehyde are allowed to react in the manner described in Example 9. Several hours after addition of the aldehyde (during which time the reaction mixture is maintained at 50° C. in a water bath) the mixture is worked up.

On extracting the ethereal solution with 2-n hydrochloric acid, the hydrochloride of phenyl-3-di-n-butylamino-propyl carbinol is precipitated as an oily intermediate layer. The base isolated therefrom boils at 136° C. (0.1 mm.).

Example 16

Using the same quantities of magnesium and chloropropyl-di-n-butylamine as given in Example 15, together with 10 grams (0.1 mol) of cyclohexanone, 1′-(3-di-n-butylamino-propyl)-cyclohexanol-(1′) of B. Pt. 118° C. (0.1 mm.) is obtained in an almost stormy reaction. The hydrochloride melts at 134–136° C.

Example 17

Using the quantities of magnesium and chloropropyl-di-n-butylamine given in Example 15, 15 grams (0.1 mol) of cuminaldehyde are brought to reaction. The 4′-isopropyl-phenyl-3-di-n-butylamino-propyl carbinol obtained boils at 154° C. (0.06 mm.). Yield 17 grams.

Example 18

In a similar manner to Examples 15–17, 15.2 grams (0.1 mol) of camphor is worked up into 2′-[3-di-n-butylamino-propyl]-borneol, B. Pt. 117–121° C. (0.09 mm.).

Example 19

22.4 grams of freshly distilled 1-chloropentyl-(5)-diethylamine (B. Pt. 52–54° C. (0.1 mm.)) in 50 ccs. of anhydrous ether are allowed to run into 3.6 grams of magnesium, activated with 0.5 cc. of ethyl bromide in 20 ccs. of absolute ether.

Whilst gently warming to 45° C., and after a further addition of ethyl bromide, 10.6 grams of benzaldehyde are added in portions. The base which is isolated at the end of the reaction, phenyl-5-diethylaminopentyl-carbinol, B. Pt. 124–127° C. (0.05 mm.), is a mobile oil.

Example 20

4.8 grams of magnesium in 20 ccs. of absolute ether are thoroughly activated with iodine and ethyl bromide, after which 30 grams (0.2 mol) of chloropropyl-diethylamine in 50 ccs. of ether are added. Whilst warming at 45–50° C., a suspension of 9 grams (0.3 mol) of well-dried paraformaldehyde in 50 ccs. of ether is allowed to flow into the reaction mixture.

The reaction proceeds very slowly. After decomposition with ice and hydrochloric acid, the base is extracted with further hydrochloric acid additions and is then liberated by means of potassium hydroxide. The 4-diethylamino-butanol-(1) obtained boils at 92–97° C. (11 mm.)

Example 21

Using the same quantities of magnesium and chloropropyl-diethylamine as in Example 15, 17.1 grams (0.15 mol) of oenanthole are caused to react to yield 10-diethylaminodecanol-(7). The reaction proceeds very violently, and the magnesium is completely used up. The decanol base shows the foaming and emulsifying properties characteristic of such bodies.

Example 22

The quantities of magnesium and chloropropyl-diethylamine used in Examples 20 and 21 may also be caused to react with 10 grams (0.1 mol) of benzonitrile. The ω-diethylamino-n-butyrophenone isolated boils at 105–106° C. (0.07 mm.) and yields a hydrochloric melting at 127–130° C.

Example 23

A mixture of 14.9 grams of chloropropyl-diethylamine (0.1 mol) and 18.2 grams of benzophenone (0.1 mol) in 100 ccs. of benzene are allowed to drop into 7.8 grams (0.2 mol) of powdered potassium in 50 ccs. of absolute benzene during 50 minutes. After addition of the first drops, the solution is coloured dark blue, and towards the end of the addition a strong reaction develops, which is moderated by cooling. The reaction mixture is allowed to stand for a further 2 hours with stirring, after which 2 ccs. of alcohol are added, followed by 150 ccs. of water. The crude base which separates, after removal of benzene, is converted into the hydrochloride and melts at 177–178° C. after recrystallization from chloroform and ethyl acetate. It shows no depression of the melting point when mixed with the diphenyl-3-diethylaminopropyl carbinol hydrochloride prepared according to Example 1.

The reaction can also be carried out in a similar manner in ether at 0° C.

Example 24

10.6 grams of benzaldehyde and 15 grams of chloropropyl-diethylamine in 50 ccs. of absolute ether are dropped over a period of 1½ hours into 7.8 grams of pulverised potassium in 100 ccs. of anhydrous ether at 0° C. After adding alcohol and water as in Example 23 the isolated base is distilled. It is identical with that obtained in Example 2.

Example 25

8.48 grams of magnesium powder are activated with iodine and are covered with 25 ccs. of dry ether. The reaction is started with 0.7 cc. of ethyl bromide, 26.5 grams of chloropropyl-diethylamine are immediately added and the whole is heated for about 1 hour. It is poured off from the magnesium in excess, better yields are however obtained if the reaction is effected without pouring off directly with 18.75 grams of meta-benzyloxy-benzaldehyde in 70 ccs. of dry ether. After working up as described in Example 2, there is obtained the meta-benzyloxy-penyl-3-diethylaminopropyl carbinol of boiling point 191–194° C. under 0.05 mm. pressure.

In analogous manner the compounds listed in the following table were also obtained.

| Parent material, halogenalkylamine | Reactive component | Reaction product | Free base | | Hydrochloride, M. P., °C. |
|---|---|---|---|---|---|
| | | | M. P., °C. | B. P., °C. | |
| Cl(CH₂)₃N(C₂H₅)₂ | Citraldehyde | α-(3-diethylamino propyl)-geraniol | | 122–124°/0.1 mm | |
| Cl(CH₂)₃N(C₂H₅)₂ | Cinnamic aldehyde | Styryl-3-diethylaminopropyl carbinol | | 140–142°/0.07 mm | |
| Cl(CH₂)₃N(C₂H₅)₂ | p-Benzyloxy-benzaldehyde | p-Benzyloxy-phenyl-3-diethylaminopropyl carbinol | 47–49 | 194°/0.05 mm | 181–184 |
| Cl(CH₂)₃N(C₂H₅)₂ | p-Dimethylaminobenzaldehyde | p-Dimethylamino-phenyl-3-diethylaminopropyl carbinol | | 150–152°/0.08 mm | |
| Cl(CH₂)₃N(C₄H₉)₂ | Benzophenone | Diphenyl-3-dibutylaminopropyl carbinol | | | 158–159 |
| Cl(CH₂)₃N(C₄H₉)₂ | Oenanthole | Hexyl-3-dibutylaminopropyl carbinol | | 130–131°/0.07 mm | |

What we claim is:

1. A process for the manufacture of an amino compound, which comprises reacting a halogen amine of the formula hal—X—Y wherein hal stands for a halogen, Y stands for a substituted amino group selected from the class consisting of

 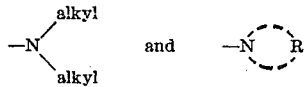

R representing the atoms necessary to complete a six-membered heterocyclic nitrogenous ring system containing only carbon and nitrogen atoms, and X stands for a saturated non-aromatic hydrocarbon chain of 3 to 5 carbon atoms interconnecting the halogen with the amino group, with a metal selected from the group consisting of magnesium, zinc and potassium, and reacting the resultant organo-metal compound with a member of the group consisting of aldehydes and ketones.

2. A process for the manufacture of an amino compound, which comprises reacting a halogen amine of the formula

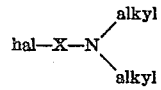

wherein hal stands for a halogen, and X stands for an alkyl chain of 3 to 5 carbon atoms interconnecting the halogen with the amino group, with magnesium, and reacting the resultant organo-metal compound with a member of the group consisting of aldehydes and ketones.

3. A process for the manufacture of an amino compound, which comprises reacting a halogen amine of the formula

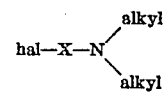

wherein hal stands for a halogen, and X stands for an unsubstituted alkyl chain of 3 to 5 carbon atoms interconnecting the halogen with the amino group, with magnesium, and reacting the resultant organo-metal compound with an aldehyde.

4. A process for the manufacture of an amino compound, which comprises reacting a halogen amine of the formula

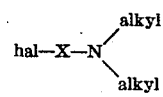

wherein hal stands for a halogen, and X stands for an unsubstituted alkyl chain of 3 to 5 carbon atoms interconnecting the halogen with the amino group, with magnesium, and reacting the resultant organo-metal compound with a ketone.

5. A process according to claim 3, wherein the magnesium is magnesium activated by treatment with a small quantity of a member of the group consisting of iodine, alkyl halide and a mixture thereof.

6. A process according to claim 4, wherein the magnesium is magnesium activated by treatment with a small quantity of a member of the group consisting of iodine, alkyl halide and a mixture thereof.

7. An amino carbinol of the formula

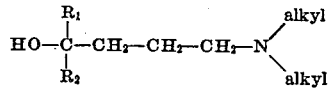

wherein $R_1$ and $R_2$ each stands for a phenyl group.

8. The amino carbinol of the formula

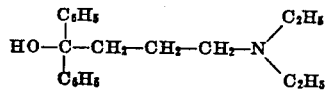

KARL MIESCHER.
ADRIAN MARXER.